United States Patent Office 3,845,200
Patented Oct. 29, 1974

3,845,200
CATALYST FOR DECOMPOSITION OF
HYDROCARBONS AND PROCESS
Joseph R. Kiovsky, Kent, Ohio, assignor to Norton
Company, Worcester, Mass.
No Drawing. Continuation-in-part of abandoned application Ser. No. 44,638, June 8, 1970. This application Mar. 20, 1972, Ser. No. 236,221
Int. Cl. C101 1/20
U.S. Cl. 423—653    1 Claim

ABSTRACT OF THE DISCLOSURE

A self-bonded or ceramic bonded zircon carrier on which nickel oxide catalyst is deposited is useful in producing hydrogen by the reaction:

$$C_xH_y \rightarrow XC + Y/2\ H_2;$$

and producing annealing gas by the reaction:

$$2\ CH_2 + O_2 \rightarrow 2CO + 4H_2;$$

at from 1800° F. to 2200° F.

---

This application is a continuation in part of application Ser. No. 44,638, filed June 8, 1970, now abandoned.

FIELD OF THE INVENTION

The invention relates to a catalyst and process for the decomposition of hydrocarbons to produce hydrogen or to produce annealing gas. In the first instance the feed is a hydrocarbon or hydrocarbon mixture such as gasoline thus:

$$C_xH_y \rightarrow C + \tfrac{1}{2}\ H_2$$

In the second gaseous hydrocarbons are mixed with air to give CO and hydrogen, thus:

$$2CH_4 + O_2 \rightarrow 2CO + 4H_2$$

BACKGROUND OF THE INVENTION

A need for a practical process for producing hydrogen in good yield from hydrocarbons such as gasoline, for use in applications such as portable fuel cells, has not been adequately met by available catalyst systems.

Similarly, a standard catalyst for producing annealing gas ($CO+H_2$), is nickel on firebrick. This catalyst is not entirely satisfactory because of its short life due to deactivation and physical disintegration.

U.S. Pat. 3,205,182 teaches that supported nickel catalysts are deactivated when exposed to oxygen due to reaction of the nickel with the support. Contrary to the teachings of that patent which require the use of a second metal oxide we have discovered that nickel oxide on zircon is an effective and stable catalyst for the decomposition of hydrocarbons to yield hydrogen, and for the partial oxidation of hydrocarbons.

SUMMARY OF THE INVENTION

The present invention involves the use of a zircon catalyst carrier for a nickel catalyst for both of the above applications. The catalyst system provides good yields of product and is superior in life to other known catalysts for these applications. The carrier material may be zircon or a mixture of zircon and up to 50% by weight of zirconia. The carrier may be self-bonded by sintering a prepared shaped mix at Orton cone 16, or higher, or preferably may be ceramic bonded by standard ceramic bonds of clay or clay and additives such as feldspar. The carrier thus may contain from 0% (for self-bonded) to, say, 20% of a ceramic bond. The metal catalyst is applied to the carrier in the form of an oxide by conventional techniques such as impregnation from a salt solution, followed by conversion to the oxide by heating. During use there will be at least partial conversion to the elemental metal form.

DESCRIPTION OF SPECIFIC EMBODIMENTS

A mix of zircon and ceramic bond was prepared from the following dry ingredients:

| | Parts by weight |
|---|---|
| Granular Zircon | 80 |
| Ball clay | 12 |
| Feldspar | 7 |
| Bentonite | 1 |

To 100 parts of the above mix were added 14.5 parts of water and 11 parts of the following mix:

| | Parts by weight |
|---|---|
| Corn flour | 3½ |
| Grease | 4½ |
| Rye flour | 1 |
| Polystyrene hollow beads (1 mm. diameter) | 2 |

The mix was formed into ½ inch spheres and fired to 1450° C.

The resulting support had the following properties:

| | |
|---|---|
| Apparent porosity | 48.5 Volume percent. |
| Water adsorption | 23.5 percent. |
| Specific gravity | 3.95 |
| Bulk density | 2.04 grams/cubic centimeter. |
| Packing density | 59.1 pounds/cubic foot. |

This carrier was impregnated by dipping in a solution of nickel nitrate hexahydrate made up of 275 grams $Ni(NO_3)_2 \cdot 6H_2O$ per hundred grams of water. The solution was held at 65° C. during impregnation and sufficient quantity was used to cover the carrier at all times during impregnation. The carrier was removed from the bath and allowed to drain, then dried at 100° C. for several hours, and finally calcined at 1100° F. to convert the nickel nitrate to nickel oxide. The catalyst contained 2.4% nickel by weight.

EXAMPLE 1

A reactor tube 2" in diameter and 1' long was packed with the catalyst described above. The reactor was heated in a gas flame to 1800–2200° F. Gasoline was pumped into the reactor at an approximate rate of 15 ml./min. In 3 to 4 minutes the catalyst would be inactivated by carbon deposition. Air was then passed over the catalyst for several minutes to burn the carbon from the catalyst. This cyclic operation was continued for 100 hours.

The gas produced during the cracking cycle was primarily hydrogen. Between 90 and 97 percent of the hydrogen in the gasoline is covered as hydrogen gas in each cycle. The average hydrogen recovery over the 100 hour period was 95%. During the 100 hour run the catalyst showed no decline in activity.

The extreme chemical stability of the catalyst is demonstrated by this example. Nickel on alumina catalysts tested in an identical manner were completely deactivated in 3 to 4 hours of operation.

This example demonstrated a process for making hydrogen from liquid hydrocarbons. The hydrogen is uncontaminated by carbon oxides which is often a considerable advantage. One area in which this invention may be very useful is the manufacture of portable hydrogen generators to provide hydrogen fuel to fuel cells. Fuel cells are used to generate electricity in remote or portable installations.

EXAMPLE 2

Approximately 1.4 ft.³ of the nickel on zircon catalyst was charged into the Inconel reactor of an annealing gas generator. The reactor was heated by gas flames to 1850° F. Air and methane gas were fed to the reactor in sufficient quantity to provide 750 s.c.f./h. of product gas ($CO+H_2+N_2$). The air was supplied in the ratio of 2.5 volume/volume of $CH_4$. This air/$CH_4$ ratio produces about 0.5 Vol. % $CO_2$ in the product gas and an approximate dew point of 25° F.

After 6 months of continuous operation, the catalyst has shown no decline in activity and no physical degradation. The product gas shows an unconverted methane content that varies from 0.1 to 0.4 percent.

The catalyst ordinarily used in these annealing gas generators is nickel impregnated firebrick. At conditions similar to those in Example 2, these catalysts normally have a useful life of 3 to 4 months.

Thus Example 2 demonstrates the usefulness of the nickel-zircon catalyst in the generation of reducing atmosphere ($CO-H_2$) by the partial combustion of methane.

A common problem in annealing plants is the coking of the catalyst. Example 1 shows that the nickel-zircon catalyst can be regenerated many times without losing its activity or physical integrity.

What is claimed is:

1. The process of reacting hydrocarbons to yield hydrogen comprising heating a catalyst consisting of nickel oxide supported on a porous base of ceramic bonded zircon grains to a temperature of from 1800° to 2200° F., passing said hydrocarbons over said catalyst, and recovering the product hydrogen.

References Cited

UNITED STATES PATENTS

| | | | |
|---|---|---|---|
| 3,256,207 | 6/1966 | Arnold | 423—415 X |
| 3,014,787 | 12/1961 | Peet | 423—651 X |
| 3,314,761 | 4/1967 | McCartney et al. | 423—651 |

CARL F. DEES, Primary Examiner